United States Patent

Sato

Patent Number: 5,771,467
Date of Patent: Jun. 23, 1998

[54] MOBILE TERMINAL WHICH HALTS AND RESTARTS DATA TRANSMISSION BASED ON BIT ERROR RATE INDEPENDENTLY OF ANY INSTRUCTION SIGNAL FROM A BASE STATION

[75] Inventor: Yukio Sato, Yokohama, Japan

[73] Assignee: Matsushita Electric Industrial Co., Ltd., Osaka, Japan

[21] Appl. No.: 525,293

[22] Filed: Sep. 7, 1995

Related U.S. Application Data

[63] Continuation of Ser. No. 132,892, Oct. 7, 1993, abandoned.

[30] Foreign Application Priority Data

Oct. 23, 1992 [JP] Japan ................................. 4-285766

[51] Int. Cl.$^6$ ..................................................... H04B 1/38
[52] U.S. Cl. ................... 455/557; 455/524; 379/100.17; 358/442
[58] Field of Search ................................. 455/33.1, 33.2, 455/54.1, 56.1, 63, 67.3, 69, 312, 89, 422, 466, 524, 517, 557, 436; 375/285, 346, 351; 371/5.1, 5.5; 358/442, 468; 379/100.01, 100.17

[56] References Cited

U.S. PATENT DOCUMENTS

| | | | |
|---|---|---|---|
| 2,967,908 | 1/1961 | Gray et al. | 375/285 |
| 3,344,353 | 9/1967 | Wilcox | 375/285 |
| 4,654,867 | 3/1987 | Labedz et al. | |
| 4,697,281 | 9/1987 | O'Sullivan . | |
| 4,701,758 | 10/1987 | Dunkerton et al. | 455/56.1 |
| 4,736,388 | 4/1988 | Eguchi | 375/285 |
| 4,756,007 | 7/1988 | Quereshi et al. | 375/285 |
| 4,912,756 | 3/1990 | Hop . | |
| 5,148,431 | 9/1992 | Hayashi | 371/5.1 |
| 5,187,807 | 2/1993 | Alard et al. | 455/53.1 |
| 5,233,429 | 8/1993 | Zuiss et al. | 379/100 |
| 5,396,654 | 3/1995 | Tripp et al. | 455/89 |
| 5,509,050 | 4/1996 | Berland | 358/442 |
| 5,561,844 | 10/1996 | Jayapalan et al. | 455/33.1 |

FOREIGN PATENT DOCUMENTS

0332818A3  8/1989  European Pat. Off. .
0473297A2  3/1992  European Pat. Off. .

*Primary Examiner*—Edward F. Urban
*Attorney, Agent, or Firm*—Watson Cole Stevens Davis, P.L.L.C.

[57] ABSTRACT

A cellular radio telephone system which halts transmission and reception of a data message in the event of detection of degradation of the circuit quality regardless of whether or not a hand-over command is generated. The system employs a decoder which compares the bit error rate of a data message signal on a radio circuit between a data terminal and a base station with a predetermined threshold, and a central processor unit which generates an instruction signal instructing to halt transmission of the data message from the data terminal when the bit error rate is larger than the threshold, and thereafter generates an instruction signal instructing to restart transmission of the data message from the data terminal when the bit error rate becomes smaller than the threshold.

1 Claim, 3 Drawing Sheets

MOBILE TERMINAL WHICH HALTS AND RESTARTS DATA TRANSMISSION BASED ON BIT ERROR RATE INDEPENDENTLY OF ANY INSTRUCTION SIGNAL FROM A BASE STATION

This application is a continuation of application Ser. No. 08/132,892, filed Oct. 7, 1993 (abandoned).

BACKGROUND OF THE INVENTION

This invention relates to a digital cellular radio telephone system which enables data message communication by an apparatus such as a facsimile apparatus (FAX).

In a cellular radio telephone system used hitherto to enable this kind of data message communication, transmission of a data message from a mobile terminal station of a calling subscriber can be halted in response to the generation of a hand-over command (a command generated so as to change a base station (a cell) of a called subscriber receiving the data message from the mobile terminal station of the calling subscriber), so that, as soon as this command is received, the transmission of the data message from the mobile terminal station of the calling subscriber can be immediately halted.

FIG. 3 schematically shows the structure of such a prior art cellular radio telephone system. that enables the desired data message communication.

Referring to FIG. 3, the prior art cellular radio telephone system includes a mobile terminal station 1, a data terminal 2 connected to the mobile terminal station 1, a plurality of base stations 3 and 4 participating in the radio communication with the mobile terminal station 1, a base station controller 5 controlling the plural base stations 3 and 4, a public telecommunication circuit network 6 to which the base station controller 5 is connected, and another data terminal 7 connected to the public telecommunication circuit network 6. When degradation of the quality of the circuit extending from, for example, the base station 3 is detected, and the hand-over is required, the handover command is sent to the mobile terminal station 1 from the base station 3. As soon as the mobile terminal station 1 receives this hand-over command from the base station 3, the data terminal 2 is instructed from the mobile terminal station 1 to halt transmission of a data message. Also, at the time of sending the hand over command to the mobile terminal station 1 from the base station 3, the base station 3 instructs through the base station controller 5 halting of the transmission of the data message to the data terminal 7 connected to the public telecommunication circuit network 6. After the hand-over is completed, the transmission of the data message can be restarted by activating a data message transmission restart command.

However, in the case of the prior art cellular radio telephone system, transmission and reception of a data message by the data terminal 2 connected to the mobile terminal station 1 cannot be halted even in the event of detection of degradation of the circuit quality unless the hand-over command is generated from the associated base station. Therefore, the prior art cellular radio telephone system has had the problem that the data message communication must be continued under the situation where the circuit quality is degraded.

SUMMARY OF THE INVENTION

With a view to solve such a prior art problem, it is an object of the present invention to provide a digital cellular radio telephone system which can halt transmission and reception of a data message in the event of detection of degradation of the circuit quality regardless of whether or not the hand-over command is generated.

The present invention which attains the above object provides a digital cellular radio telephone system in which a data terminal is connected to a mobile terminal station to make data communication with a base station, comprising:

a decoder comparing the bit error rate of a data message signal on a radio circuit between the data terminal and the base station with a predetermined threshold; and a central processor unit generating an instruction signal instructing to halt transmission of a data message from the data terminal when the bit error rate is larger than the threshold, and thereafter generating an instruction signal instructing to restart transmission of the data message from the data terminal when the bit error rate becomes smaller than the threshold.

Therefore, according to the present invention, the mobile terminal station monitors to detect degradation of the circuit quality by comparing the bit error rate with a predetermined threshold without the need for application of the hand-over command between the base station and the mobile terminal station, so that transmission of a data message between the mobile terminal station and the connected data terminal can be permitted and halted as desired under control of the central processor unit disposed in the mobile terminal station.

DESCRIPTION OF THE PREFERRED EMBODIMENTS

A preferred embodiment of the digital cellular radio telephone system according to the present invention will now be described by reference to FIG. 1 and FIGS. 2A and 2B.

Figure 1:
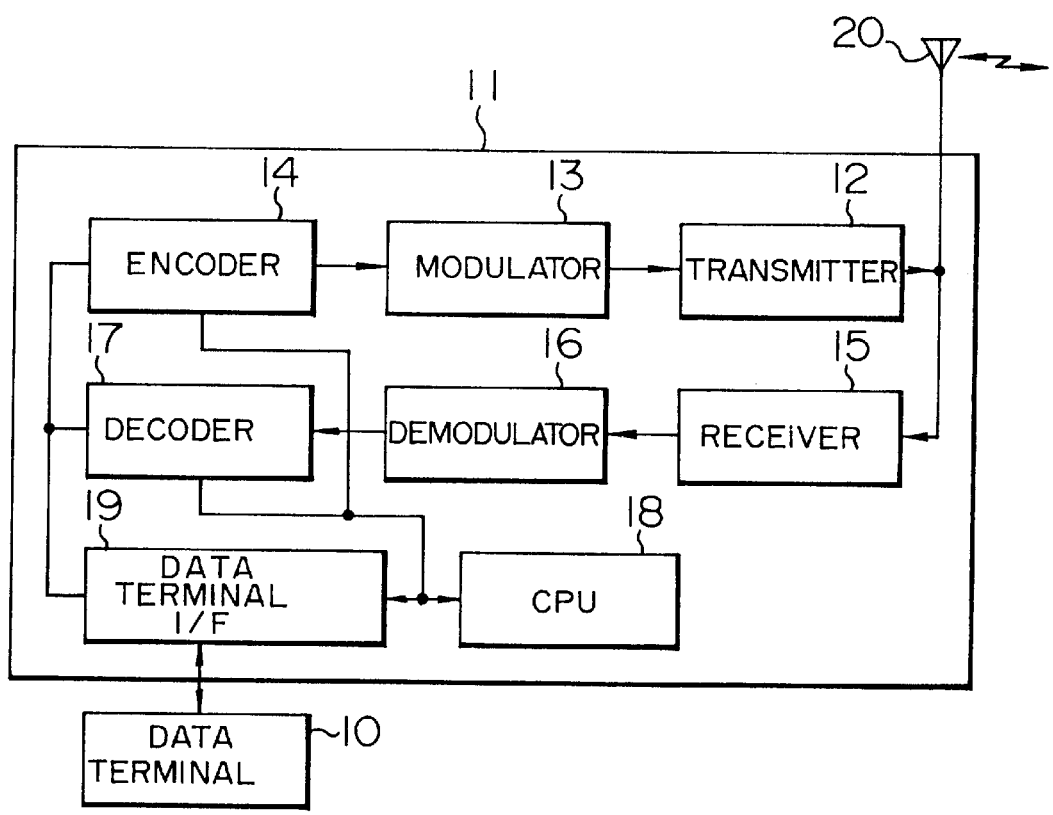
FIG. 1 is a schematic block diagram showing the structure of a mobile terminal station connected to a data terminal in an embodiment of the digital cellular radio telephone system according to the present invention.
Figure 2A:
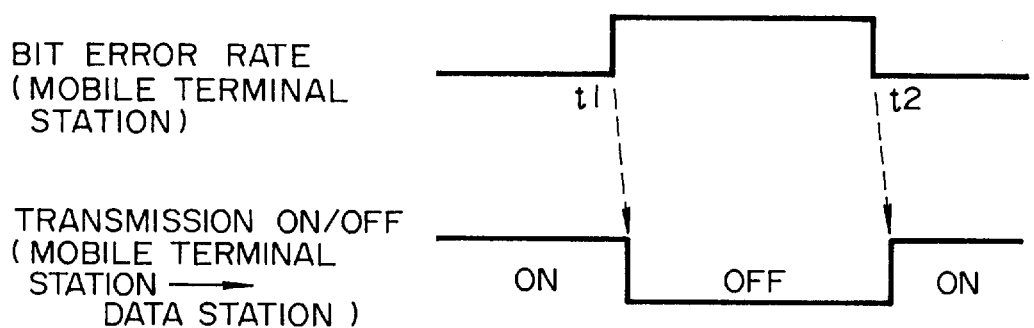
FIGS. 2A and 2B are timing charts of operation of the digital cellular radio telephone system of the present invention shown in FIG. 1 in the data transmission and reception modes respectively.

FIG. 1 shows schematically the structure of a mobile terminal station connected to a data terminal in the digital cellular radio telephone system embodying the present invention, and this digital cellular radio telephone system is of the TDMA (time division multiplex) type. Referring to FIG. 1, the reference numerals 10 and 11 designate the data terminal and the mobile terminal station connected to the data terminal 10, respectively.

The mobile terminal station 11 includes a transmitter 12 transmitting a radio wave toward a base station (not shown), a modulator 13 modulating an input signal to be applied to the transmitter 12, an encoder 14 encoding a data message supplied from the data terminal 10, a receiver 15 receiving a radio wave transmitted from the base station, a demodulator 16 demodulating a modulated signal received by the receiver 15, and a decoder 17 decoding the demodulated signal appearing from the demodulator 16. The mobile terminal station 11 further includes a central processor unit (referred to hereinafter as a CPU) 18 controlling the operation of the mobile terminal station 11, and a data terminal interface (I/F) 19 acting as a data interface between the data terminal 10 and the mobile terminal station 11.

In the mobile terminal station 11 having the structure shown in FIG. 1, the transmitter 12 and the receiver 15 do not simultaneously operate. Therefore, a single antenna 20 is switched over to operate as a transmitting antenna in the signal transmission mode and as a receiving antenna in the signal reception mode. The encoder 14 encodes a digital speech signal or a digital message signal to be transmitted to a mating station, that is, the base station, so that a bit error, if any, can be corrected at the time of decoding the transmitted data signal by a decoder in the base station. This encoded data signal is subjected to digital modulation by the modulator 13, and the output signal of the modulator 13 is then transmitted in a burst transmission mode (a mode of signal transmission in a predetermined constant period only) from the transmitter 12.

On the other hand, a radio signal received in a burst reception mode (a mode of signal reception in a predetermined constant period only) by the receiver 15 is subjected to digital demodulation by the demodulator 16, and the output signal of the demodulator 16 is then decoded by the decoder 17 into the original digital speech signal or data message signal. The data terminal interface 19 has a data communication function so as to carry out data message transmission and reception between it and the data terminal 10.

In the embodiment of the digital cellular radio telephone system according to the present invention, the decoder 17 compares the bit error rate (the error rate of data bits due to signal transmission and reception on the radio circuit) with the predetermined threshold.

The manner of communication between a base station and the digital cellular radio telephone system of the present invention will now be described by reference to FIGS. 2A and 2B.

When the data terminal 10 is in its transmission mode, the mobile terminal station 11 continuously monitors the quality of the radio circuit by computing the bit error rate. That is, the threshold of the radio circuit quality estimated to cause generation of a bit error when the data message signal is decoded by the decoder in the base station is compared with the bit error rate by the mobile terminal station 11 so as to monitor the quality of the radio circuit. As soon as the bit error rate exceeds the predetermined threshold at time t1 as shown in FIG. 2A, the CPU 18 applies an instruction signal through the data terminal interface 19 to the data terminal 10 to turn off the transmission mode from the on state, thereby halting transmission of the data message from the data terminal 10. However, in this case, dummy data (data generated so as to detect halting of data message transmission to the base station) is generated from the encoder 14 so as not to halt the data message transmission from the transmitter 12 toward the base station.

After the data message transmission is halted at time t1, the bit error rate becomes smaller than the predetermined threshold at time t2 to indicate that the circuit quality is now restored, and the CPU 18 instructs the data terminal 10 to restart transmission of the data message.

Figure 2B:
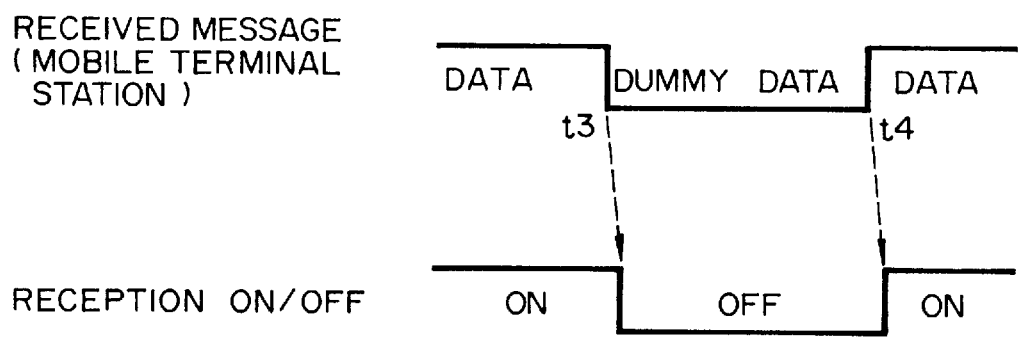
Figure 3:
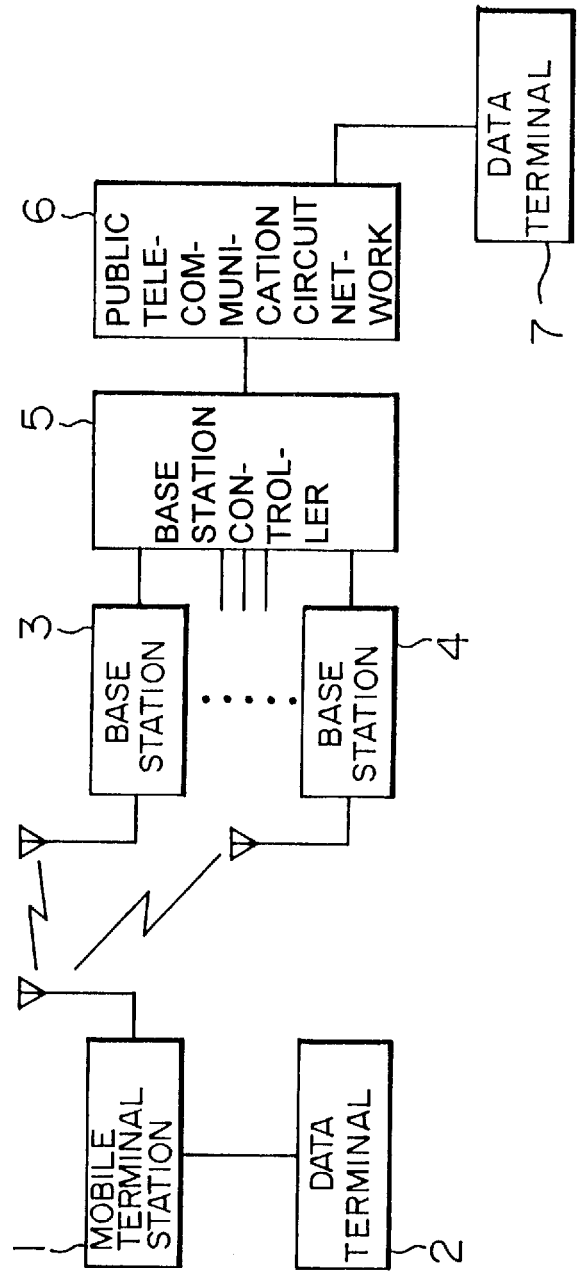
FIG. 3 is a schematic block diagram showing the arrangement of a prior art cellular radio telephone system.

On the other hand, when the circuit quality is degraded while the data terminal 10 is placed in its reception mode, transmission of a received data message from the base station is halted at time t3, and the data message is replaced by dummy data, as shown in FIG. 2B. Therefore, on the basis of appearance and disappearance of the dummy data, the times of halting and restarting transmission of the received data message from the base station are detected. In the digital cellular radio telephone system embodying the present invention, the decoder 17 detects the times of halting and restarting transmission of the received data message from the base station. According to the result of detection, by the decoder 17, of the times of halting and restarting reception of the data message, the CPU 18 instructs the data terminal 10 to halt or restart receiving the data message from the base station.

The operation similar to that described above is carried out on the side of the base station too, so that data message transmission and reception by the data terminal is halted and restarted under control by the base station controller.

It will be apparent from the foregoing description of the embodiment of the digital cellular radio telephone system of the present invention that transmission and reception of a data message by a data terminal connected to a mobile terminal station can be halted in the event of detection of degradation of the circuit quality regardless of whether or not the hand-over command generated from a base station is applied to the mobile terminal station, so that the data message transmission and reception by the data terminal can be retarted as soon as the circuit quality is restored.

I claim:

1. A mobile terminal station for use in a digital cellular radio telephone system in which a data terminal is connected to said mobile terminal station to make data communication with a base station of a plurality of base stations, said mobile terminal station comprising:

a decoder which receives an indication of a bit error rate of a non-voice data message signal transmitted on a radio circuit from said data terminal to said base station and compares said bit error rate with a predetermined threshold; and a central processor unit which generates, without receiving a hand-over command or an instruction signal to halt transmission from any of said base stations, a first instruction signal instructing to halt transmission of said data message signal from said data terminal to said base station in response to said decoder determining that said bit error rate is larger than said threshold and thereafter generates, without receiving from any of said base stations an instruction signal to restart transmission, a second instruction signal instructing to restart transmission of the data message signal from said data terminal to said base station in response to said decoder determining that said bit error rate is smaller than said threshold, wherein:

when transmission of the data message signal from said data terminal to said base station of said plurality of base stations is halted in response to said first instruction signal, said decoder generates dummy data for transmission to said base station of said plurality of base stations to indicate degradation of quality of said radio circuit.

* * * * *